(12) United States Patent
Rosenfeld et al.

(10) Patent No.: US 10,323,543 B2
(45) Date of Patent: Jun. 18, 2019

(54) CONVERSION OF POWER PLANTS TO ENERGY STORAGE RESOURCES

(71) Applicant: Third Power, LLC, Bedford, NY (US)

(72) Inventors: Matthew I. Rosenfeld, Irvington, NY (US); Bikram Chatterji, Brooklyn, NY (US)

(73) Assignee: Third Power, LLC, Bedford, NY (US)

( * ) Notice: Subject to any disclaimer, the term of this patent is extended or adjusted under 35 U.S.C. 154(b) by 242 days.

(21) Appl. No.: 14/810,917

(22) Filed: Jul. 28, 2015

(65) Prior Publication Data

US 2016/0024973 A1 Jan. 28, 2016

Related U.S. Application Data

(60) Provisional application No. 62/029,821, filed on Jul. 28, 2014.

(51) Int. Cl.
| | |
|---|---|
| *F01K 3/00* | (2006.01) |
| *F01K 3/18* | (2006.01) |
| *F28D 20/00* | (2006.01) |

(52) U.S. Cl.
CPC .............. *F01K 3/186* (2013.01); *F28D 20/00* (2013.01); *F28D 2020/0047* (2013.01); *Y02E 60/142* (2013.01)

(58) Field of Classification Search
CPC .... Y10T 29/49716; F25B 25/00; F25B 1/053; F25B 25/005; F25B 40/00; F25B 1/10; F25B 2339/047; F25B 2400/24
USPC ....................................................... 60/641.8
See application file for complete search history.

(56) References Cited

U.S. PATENT DOCUMENTS

| | | | | |
|---|---|---|---|---|
| 6,927,503 | B2 * | 8/2005 | Enis | F02C 6/16 |
| | | | | 290/55 |
| 9,391,254 | B2 * | 7/2016 | Lessard | H01L 35/30 |
| 9,638,173 | B2 * | 5/2017 | Ehrsam | F03G 6/003 |
| 2004/0148922 | A1 * | 8/2004 | Pinkerton | F02C 1/05 |
| | | | | 60/39.6 |
| 2005/0241311 | A1 * | 11/2005 | Pronske | F01K 3/18 |
| | | | | 60/645 |
| 2007/0220889 | A1 * | 9/2007 | Nayef | F01K 3/08 |
| | | | | 60/652 |
| 2008/0127647 | A1 * | 6/2008 | Leitner | F02C 1/007 |
| | | | | 60/645 |
| 2009/0211249 | A1 * | 8/2009 | Wohrer | F01K 3/00 |
| | | | | 60/641.8 |
| 2010/0031654 | A1 * | 2/2010 | Barbero Ferrandiz | |
| | | | | F03D 9/007 |
| | | | | 60/641.8 |

(Continued)

*Primary Examiner* — Mark A Laurenzi
*Assistant Examiner* — Shafiq Mian
(74) *Attorney, Agent, or Firm* — Mintz Levin Cohn Ferris Glovsky and Popeo, P.C.

(57) ABSTRACT

A thermal energy storage system includes one or more components from a Rankine Cycle power plant such as steam turbine and other equipment. The system can include a thermal storage material, a heat source that is heated by running electricity through a heating element for heating the thermal storage material, and a heat exchange for generating steam using the thermal energy stored in the thermal storage material. The system can be configured to store energy during periods of low electricity demand or abundant supply. The system can be configured to generate electricity using the stored thermal energy to generate steam and run one or more turbines.

20 Claims, 7 Drawing Sheets

(56) References Cited

U.S. PATENT DOCUMENTS

| | | | | |
|---|---|---|---|---|
| 2011/0048011 A1* | 3/2011 | Okita | ................. | F01K 7/18 |
| | | | | 60/649 |
| 2011/0162829 A1* | 7/2011 | Xiang | ................. | C09K 5/063 |
| | | | | 165/234 |
| 2011/0277469 A1* | 11/2011 | Brenmiller | ................. | F03G 6/067 |
| | | | | 60/641.8 |
| 2012/0255471 A1* | 10/2012 | Mishima | ................. | F23C 7/08 |
| | | | | 110/347 |
| 2013/0081394 A1* | 4/2013 | Perry | ................. | F03G 6/005 |
| | | | | 60/641.8 |
| 2014/0265573 A1* | 9/2014 | Kreutzman | ................. | F24H 1/0018 |
| | | | | 307/31 |
| 2015/0354545 A1* | 12/2015 | Conlon | ................. | F01K 3/02 |
| | | | | 60/39.182 |

* cited by examiner

CONVERSION OF POWER PLANTS TO ENERGY STORAGE RESOURCES

CROSS-REFERENCE TO RELATED APPLICATION

This application claims the benefit of U.S. Provisional Patent Application No. 62/029,821, filed on Jul. 28, 2014, the contents of which are incorporated herein by reference in their entireties.

TECHNICAL FIELD

The subject matter described herein relates to conversion of existing power plants to energy storage resources.

BACKGROUND

Many coal-fired power plants today are struggling to remain viable, due to both competition from natural gas and increasingly stringent environmental restrictions on emissions, which require expensive retrofits and the development of new technologies to ensure compliance. In addition to rules already in place, on Jun. 2, 2014 the Environmental Protection Agency announced a proposal to reduce $CO_2$ emissions from power plants to 30% below 2005 levels by 2030. Per a fact sheet released in January 2015, the EPA expects to issue final rules under the "Clean Power Plan" in the summer of 2015. These are likely to put increased pressure on coal generation, which is responsible for 75% of power-related $CO_2$ emissions.

Owners of coal-fired power plants are currently limited to three options for responding to these economic and environmental pressures:
  a. Switching to a less carbon-intensive fuel source, such as natural gas or biomass.
  b. Installing emissions controls such as scrubbers.
  c. Decommissioning and retiring the plant.

The first two of these options, which keep the plant operational and available, are expensive, and are only warranted in cases where the plant will enjoy continued revenues sufficient to pay back the capital investment required. Large revenue streams are more likely when plants can act as baseloading facilities, producing power at all times (this is also the mode of operation favored by traditional Rankine cycle coal plants). However, low natural gas prices and the widening availability of off-peak wind generation put pressure on energy prices overnight, thereby squeezing baseloading coal plant's margins.

Consequently, many coal plants choose the third option from the list above, retiring rather than investing additional money into the facilities. According to the U.S. Energy Information Agency, upwards of 50,000 MW of coal-fired generation are being taken out of service between 2010 and 2020, before accounting for the Jun. 2, 2014 E.P.A. announcement. At the same time as off-peak prices are falling in response to increasing supply and lowering fuel costs, the need for on-peak generation continues to grow. The Energy Information Association (EIA) predicts 12,000 MW of simple-cycle (peaking) generation growth from 2011 to 2020. Removing more baseloading coal plants from operations will only increase this need.

BRIEF SUMMARY

The present subject matter provides a flexible energy storage system that can store heat energy and generate electricity from the stored energy. In some embodiments, an existing power plant (e.g., a Rankine cycle power plant) can be converted into a flexible on-peak energy storage system that uses heat stored in a thermal storage material (e.g., TES material) as its heat source. In some embodiments, one or more of, for example, the turbine, generator, auxiliary systems, and transmission of an existing plant can be maintained and repurposed for use in the energy storage system. One or more other parts, such as the existing boiler, fuel handling, and stacks may be scrapped. Assembly of the system includes adding and/or integrating a thermal storage tank with hot-temperature thermal storage material, a charging heating element, and a steam-production heat exchanger with the existing plant. Additional equipment may be included in some embodiments of the system.

In some embodiments, System operations can include one or more modes such as:
  "Charging", in which electricity is drawn from the grid to heat the heating element, which in turn heats the hot-temperature thermal storage material;
  "Idling", in which minimal or no heat is added to the thermal storage material to maintain a "charged" state;
  "On Reserve", in which a minimal amount of thermal energy is drawn from the storage tank to maintain the turbine in a spinning state, without producing, for example, any substantial power out or full power output; and
  "Discharging" in which heat is drawn from the thermal energy storage system to generate steam that is used to drive the turbine and produce power.

In some embodiments, the conditions of the steam generated in the Discharge phase matches the required steam conditions of the power generation system. In some embodiments, system operations can be optimized to "charge" when there is an excess of power on the grid (relative to demand), for example, as often occurs overnight.

In some embodiments, the storage system can be configured to "spin" during normal daily operations, for example, when ramping resources are capable of meeting demand, and to "discharge" when demand peaks, for example, in the mid-to-late afternoon in the summer, and more sporadically in the winter.

The storage system can be optimized to include one or more different configurations and variations on the charging, reserve, and discharging capabilities based on, for example, market, grid, and/or technical considerations.

SUMMARY

Variations of the present subject matter are directed to methods, systems, devices, and other articles of manufacture that can be utilized to convert existing power plants to energy storage resources.

Among other features, the present subject matter provides a method for converting an existing power plant to a thermal energy storage system. In some implementations, the method includes replacing a boiler with a thermal energy storage assembly that includes a thermal storage tank comprising a thermal storage material, a charge source operationally connected to the storage tank to heat the thermal storage material; and a heat exchanger operationally connected to the storage tank to generate a steam using thermal energy stored in the thermal storage material. The method also includes connecting the thermal energy storage assembly to one or more turbines so that that the steam generated by the heat exchange can power the one or more turbines to convert thermal energy stored in the thermal storage tank to electricity.

In some implementations, the method can further include operationally connecting one or more of a generator, auxiliary system, and transmission system of the existing power plant to the thermal energy storage system.

In some implementations, the thermal energy storage assembly further includes an additional tank operationally connected to an output of the heat exchanger to receive the thermal storage material discharged from the heat exchanger. The additional tank can also be operationally connected to an input of the charge source to supply the charge source with the thermal storage material that has been discharged from the heat exchanger.

The present subject matter also provides an energy storage system that includes one or more turbines powered by steam to generate electricity. The system can also include an energy storage tank comprising a thermal storage material for storing thermal energy; a charging source operationally connected to the storage tank for heating and charging the thermal storage material; and a heat exchanger operationally connected to the storage tank to generate steam using the thermal energy stored in the thermal storage material. The heat exchanger can be operationally connected to the one or more turbines to feed the generated steam to the one or more turbines. The one or more turbines are powered entirely or substantially entirely by the steam generated by the thermal energy stored in the thermal storage material.

In some implementations, the energy storage system can further include an additional tank operationally connected to an output of the heat exchanger to receive the thermal storage material discharged from the heat exchanger. The additional tank can also be operationally connected to an input of the charge source to supply the charge source with the thermal storage material that has been discharged from the heat exchanger.

In some implementations, the one or more turbines are part of an existing power plant. In some implementations, the energy storage system further includes a generator powered by the one or more turbines to generate electricity. In some implementations, the generator is part of an existing power plant.

In some implementations, the one or more turbines include a high pressure turbine and a lower pressure turbine. The heat exchanger can be connected to the turbines such that the high pressure turbine can be bypassed.

In some implementations, the charging source is submerged in the energy storage tank. In some implementations, the charging source is external to the energy storage tank.

In some implementations, the system further includes an additional energy storage tank operationally connected to the one or more turbines, the additional energy storage tank comprising another thermal storage material that can operate at a higher temperature than the thermal storage material of the energy storage tank. In some implementations, the other thermal storage material is configured to super-heat the medium by the heat exchanger.

In some implementations, the system is operable in an idling mode in which minimal or no heat is added by the charging source to the thermal storage material to maintain a charged state.

In some implementations, the system is operable in an on-reserve mode in which a minimal amount of thermal energy is drawn from the storage tank to maintain the one or more turbines in a spinning state without producing a substantial power out.

The present subject matter also provides a method for thermal energy storage including storing thermal energy in a thermal storage material of an energy storage tank using a heating element powered by electricity; using the stored thermal energy to heat a heat exchanger to generate a steam; and spinning one or more turbines using entirely or substantially entirely the steam generated by the heat exchanger from the stored thermal energy.

In some implementations, the method further includes operating in an idling mode in which minimal or no heat is added to the thermal storage material to maintain a charged state. In some implementations, the method further includes operating in an on-reserve mode in which a minimal amount of thermal energy is drawn from the storage tank to maintain the one or more turbines in a spinning state without producing a substantial power output.

In some implementations, the method further includes storing the thermal storage energy material discharged from the heat exchanger in an additional tank. In some implementations, the method further includes heating the thermal energy material from the additional tank and pumping the heated thermal energy material to the energy storage tank to be stored.

DESCRIPTION

Figure 1:
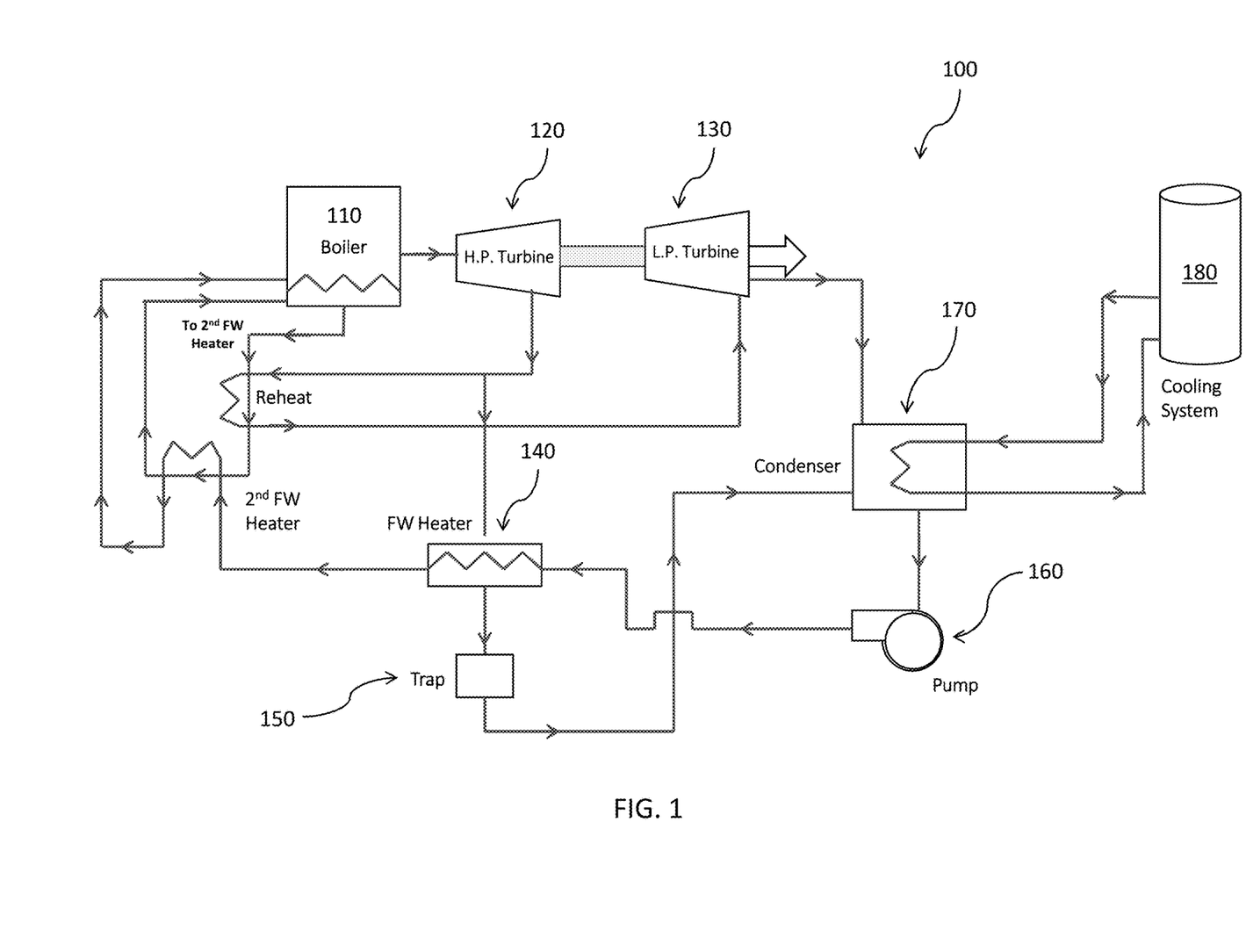
FIG. 1 is a schematic illustration of an example of a Rankine steam power plant which can be converted to a storage system in accordance with the present subject matter.

FIG. 1 is a schematic illustration of an example of a Rankine steam power plant which can be converted to a storage system in accordance with the present subject matter. At their core, Rankine power systems like system 100 shown here include a boiler 110, turbines 120 and 130, condenser 170, and a pump 160. Additional components can be added to the basic cycle, for example, to improve efficiency, increase power output, and/or allow for a division of uses (i.e. heat and power). The present subject matter can work with any Rankine system and the system being shown in FIG. 1 is only one example of such a system meant for illustrative purposes.

Figure 2:
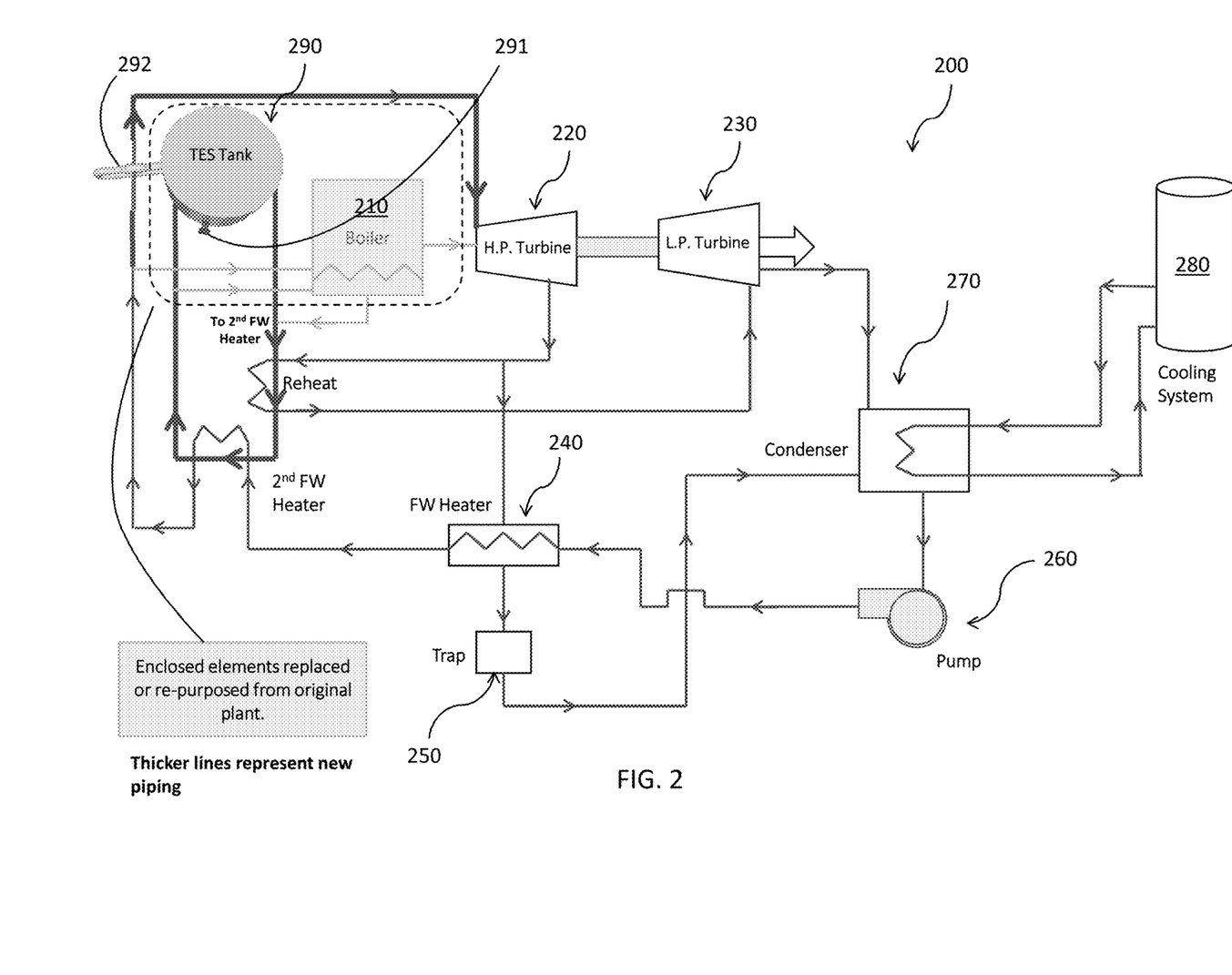
FIG. 2 is a schematic illustration of an example of a full replacement installation using the Rankine system of FIG. 1.

FIG. 2 shows an example of a full replacement installation using the Rankine system of FIG. 1. In this example, parts of the Rankine system of FIG. 1 that have been repurposed include high-pressure turbine 220, low-pressure turbine 230, primary feedwater (FW) heater 240, a second FW heater, trap 250, pump 260, condenser 270, and cooling system 280.

Boiler 210 is replaced by a thermal storage assembly including TES tank 290, heating element 291, and heat exchanger 292. One or more pipes that previously fed into Boiler 210 are rerouted to feed into heat exchanger 292, prior to feeding into the turbines 220 and 230. Pipes from the boiler 210 to the secondary FW heater are re-routed or augmented to originate from the TES tank 290. (See, for example, the thicker lines in FIG. 2 that represent new piping and phantom lines that represent the old piping.) In some embodiments, the electric heating element 291 used to charge the system 200, the storage tank(s) 290, and the heat exchanger 292 for discharging the system can be sized independently.

In some embodiments, a thermal storage assembly in accordance with the present subject matter can replace and/or supplement a boiler of an existing power plant such that the steam powering the turbines is derived entirely or substantially entirely from the thermal energy stored in the thermal storage assembly. In some embodiments, the system of the present subject matter can be configured such that less than 15%, 10%, 5%, or none of the steam powering the one or more turbines is generated by the boiler of an existing power plant, while the remainder of the steam is generated by the thermal storage assembly.

Figure 3:
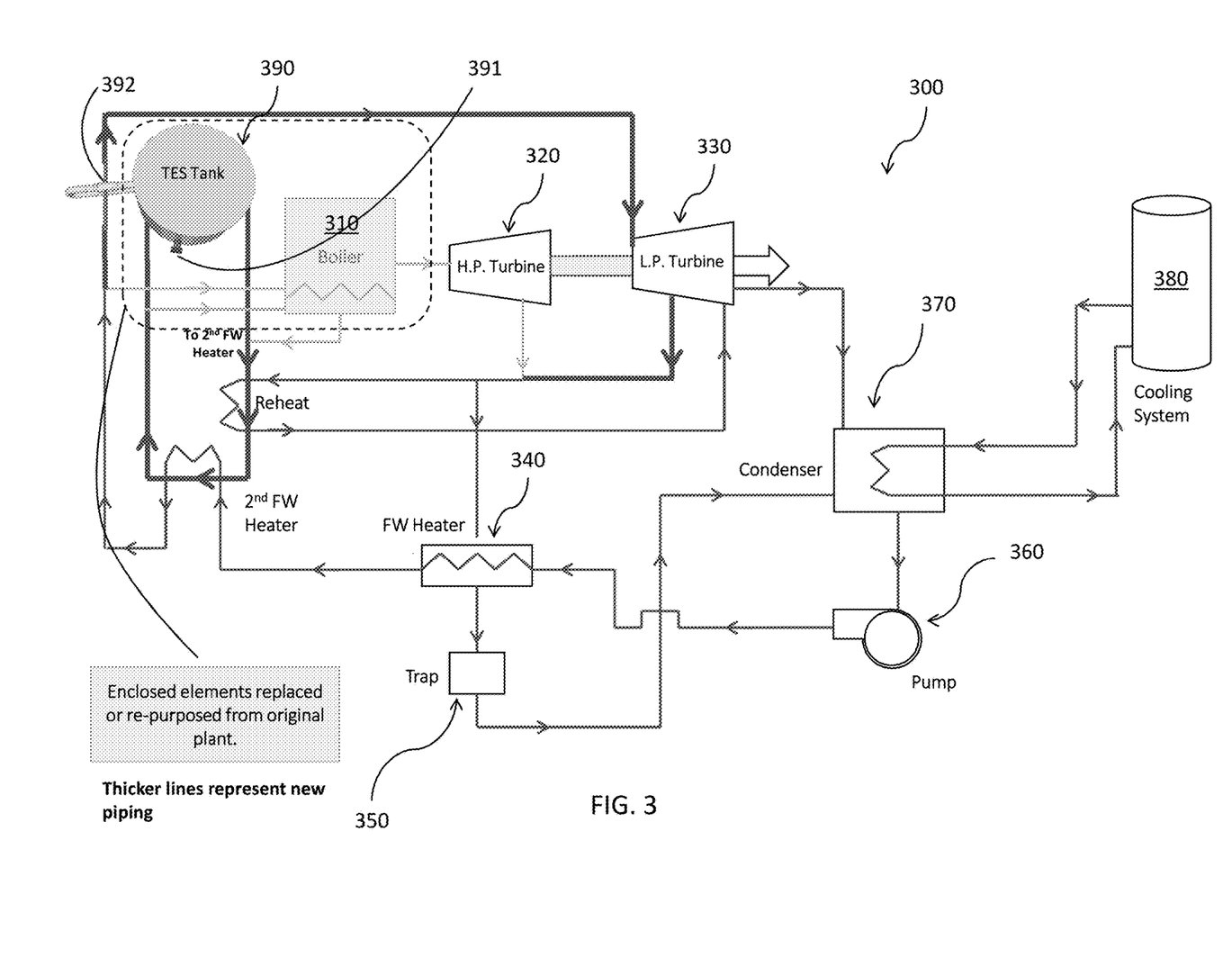
FIG. 3 is a schematic illustration of an example of a storage system in accordance with the present subject matter.

FIG. 3 illustrates an example of storage system in accordance with the present subject matter that de-rates the power plant. This configuration is similar to the example shown in FIG. 2, but bypasses the high-pressure turbine. In this example, parts of the Rankine system of FIG. 1 that have been repurposed include low-pressure turbine 330, primary feedwater (FW) heater 340, a second FW heater, trap 350, pump 360, condenser 370, and cooling system 380. Boiler 310 is replaced by a thermal storage assembly including TES tank 390, heating element 391, and heat exchanger 392. One or more pipes that previously fed into Boiler 310 are rerouted to feed into heat exchanger 392, prior to feeding directly into low-pressure turbine 330. Thus, the high-pressure turbine 320 is bypassed. Pipes from the high-pressure turbine 320 to the FW Heater 340 are re-routed or augmented to come from an extraction from low-pressure turbine 320. Pipes from the boiler 310 to the secondary FW heater are re-routed or augmented to originate from the TES tank 390. (See, for example, the thicker lines in FIG. 3 that represent new piping and phantom lines that represent the old piping.) This configuration is suitable for cases in which the TES tank 390 and heat exchanger 392 cannot produce steam suitable for the high pressure turbine 320; for instance, if the TES material in the tank 390 cannot achieve high enough temperatures, or if the heat exchanger 392 cannot transfer enough heat into the plant's process water. In this configuration, the high-pressure turbine 320 can be removed and/or scrapped.

Figure 4:
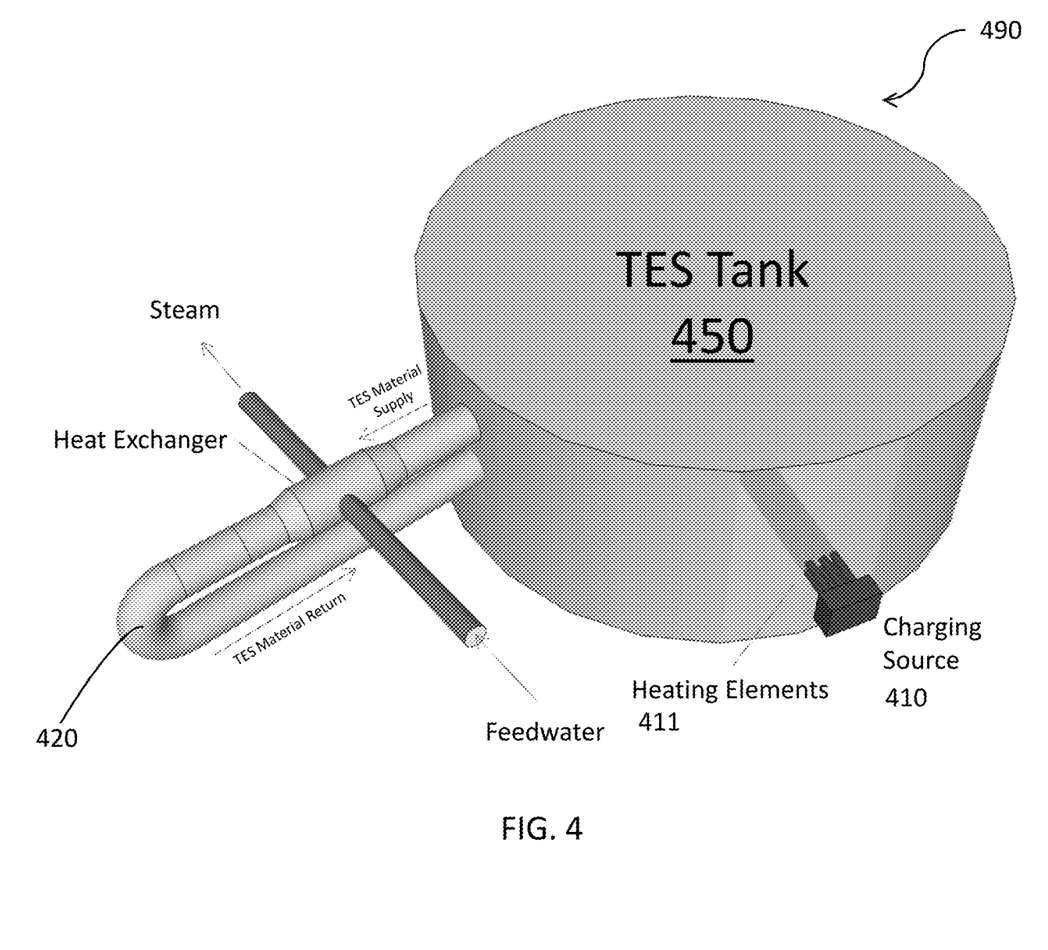
FIG. 4 is an illustration of a configuration of the storage apparatus in which the electrical heating element is located inside the thermal energy storage tank.

FIG. 4 depicts a configuration of the storage apparatus (like the thermal storage assembly shown in FIG. 3) in which the electrical heating element(s) 411 of charging source 410 is located inside the thermal energy storage tank 450. The storage apparatus includes output 420, which includes a heat exchanger for heating up the feedwater (and generating steam) from the heat stored in the TES material. Placing the heating element(s) 411 inside the tank allows it to have direct contact with the TES material at all times, removing the need to pump the TES material to the heating element. This allows for a potentially more streamlined or compact design that can save space. Placing the heating elements inside the tank also allows for the possibility of a phase change during discharge. Since the storage material would not have to remain in a molten or liquid state that could easily be pumped at all times, freezing or partial freezing of the TES material could occur. A phase change such as one from liquid to solid would allow for vast amounts of heat transfer at a constant temperature.

Figure 5:
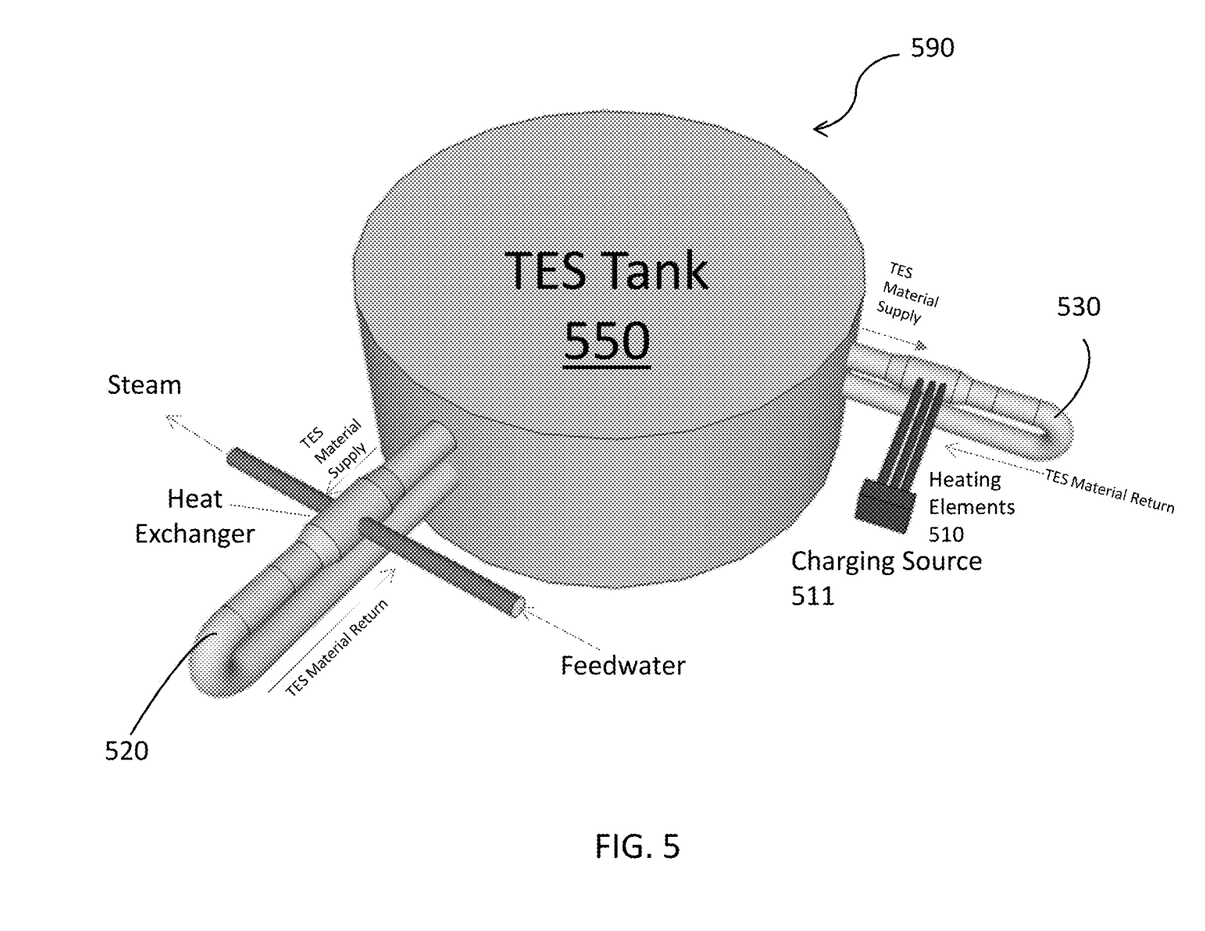
FIG. 5 is an illustration of a variation of a storage apparatus in accordance with the present subject matter.

FIG. 5 shows a configuration of the storage apparatus that is similar to the one shown in FIG. 5 except the electrical heating element 510 of charging source 511 is external to the thermal energy storage tank. This configuration is more typical of the way hot TES materials are used today; the TES material remains liquid at all times. During the charging phase, the relatively cooler molten material is pumped to the external heating element 510, heated up, and returned to the tank 550. In addition to being closer to the current technology, this configuration maximizes the usable volume of the TES tank 550, by housing the heating elements externally. It also may simplify maintenance of the heating element. It may also allow for easier system upgrades in that additional tanks and TES material can be added to the system without the need to add heating elements.

Figure 6:
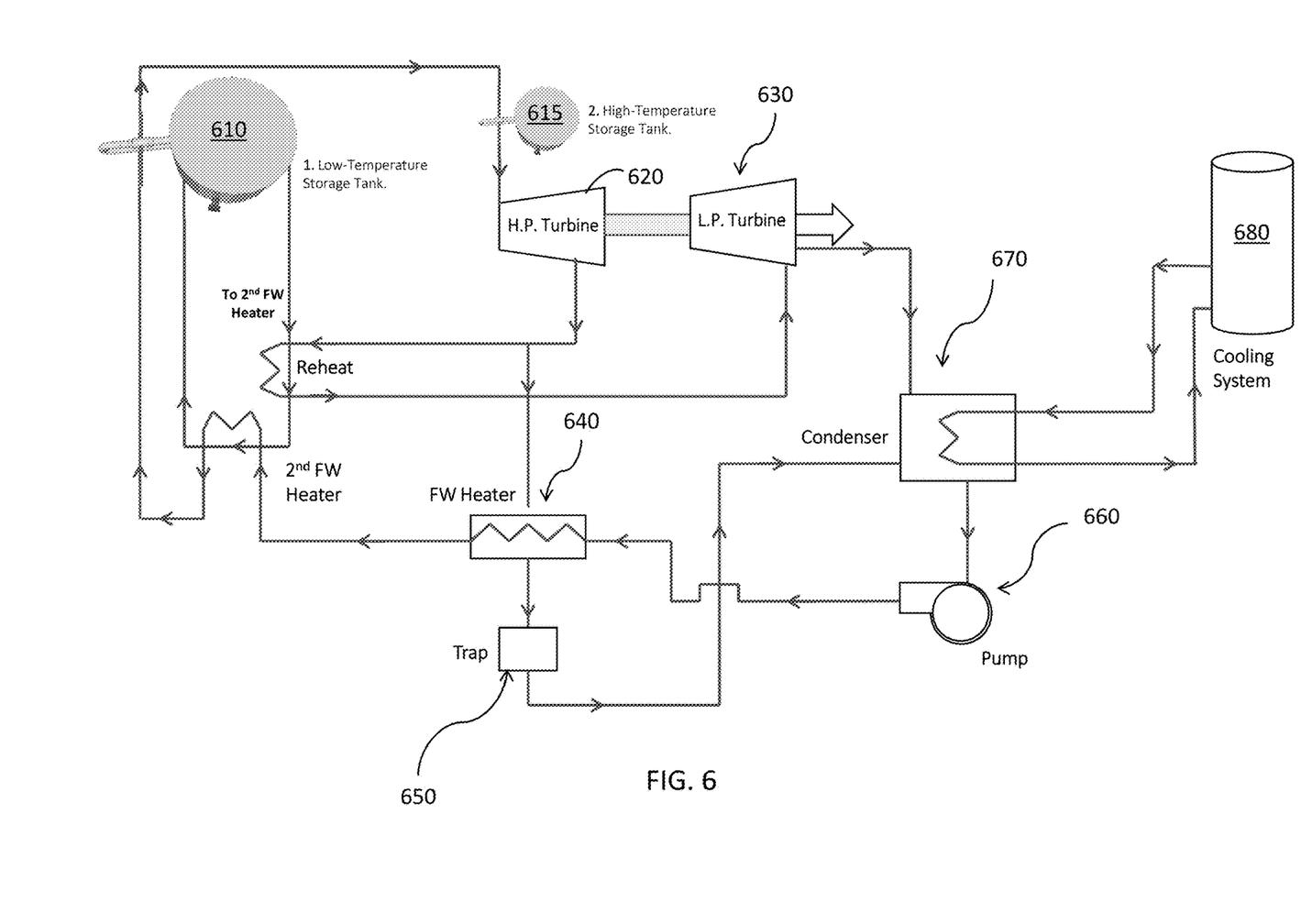
FIG. 6 is an illustration of another variation of a configuration of a storage apparatus in accordance with the present subject matter.

FIG. 6 shows a configuration that is similar to the one shown in FIG. 2 except that two storage materials are provided at different temperatures. The smaller thermal energy storage tank 615 is at a higher temperature than the larger thermal energy storage tank 610, and is responsible for super-heating the steam. Super-heating steam (i.e., raising the temperature of steam beyond its saturation temperature) is desirable because it results in more efficient Rankine cycles: heat added during the super-heating phase is very efficiently converted electricity through a turbine-generator. Some plants may have turbines that are sized for super-heated steam. Because higher-temperature TES materials and tanks that can handle higher temperatures, both of which would be required for super-heating, may be more expensive than materials operating at a lower temperature, the two-tank configuration in FIG. 6 may be a cost-effective approach to super-heating. The larger tank 610 could be filled with lower-cost, lower-temperature TES material, sufficient to create saturated steam. Pipes would be installed to route this steam to the smaller tank 615, which could contain limited amount of higher-cost, higher-temperature TES material, for super-heating. This type of configuration can work because a vast majority of the heat needed to run the power cycle goes into the phase change of boiling water to generate saturated steam. In some embodiments, other combinations of tanks (e.g., different tank sizes and/or temperatures) are provided.

Figure 7:
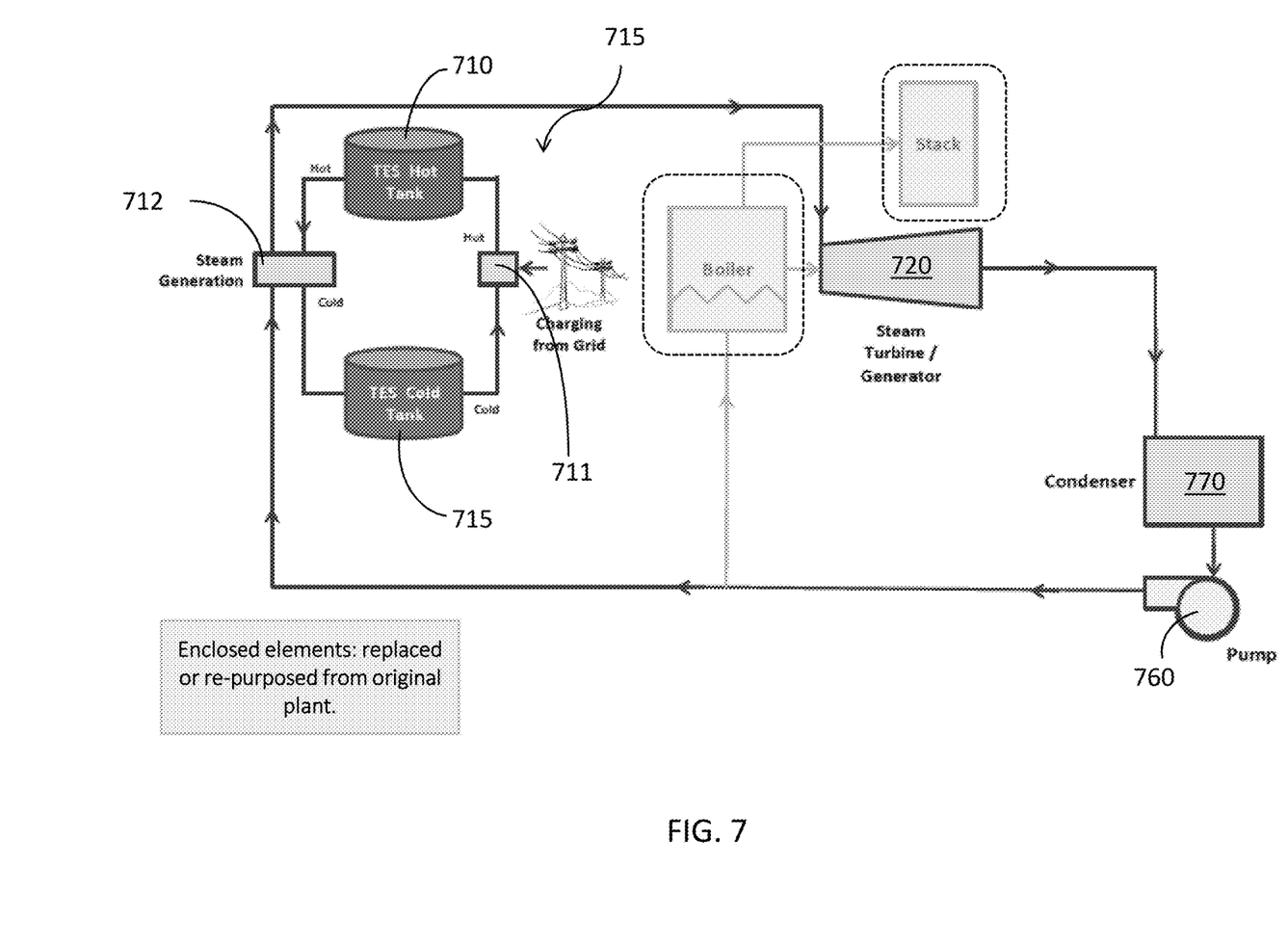
FIG. 7 is a schematic illustration of another example of a storage system in accordance with the present subject matter.

FIG. 7 depicts a two-tank thermal storage system that includes a hot tank (TES Hot Tank 710) and a cold tank (TES Cold Tank 715). Here, electric energy is converted (charged) from the grid and stored in the dedicated "hot tank" 710. The hot TES material can flow from the hot tank 710 through a heat exchanger 712 to generate steam. The cooler (but still hot) TES material discharges from the heat exchanger and is stored in the cold tank 715. The cycle completes when the cooler TES material flows from the cold tank 715 to be heated by heating system 711 (which converts electricity to heat) and stored in the hot tank 710. The steam generated by the heat exchanger 712 can be fed into one or more steam turbine/generators, which include high pressure and/or low pressure turbines (for example).

A power generator such as a Rankine cycle generating unit currently operating using a conventional fuel source (coal, fuel oil, uranium, etc.) can be converted into a 100% energy storage device to enhance grid reliability and provide critical reserves and peaking energy. In some embodiments, the present subject matter repurposes and replaces one or more existing equipment to implement a stand-alone storage system, which can provide, for example, peaking energy, spinning reserve, and other ancillary grid services. In some embodiments, the existing fuel-burning boiler can be replaced with a high-temperature storage material in an insulated tank, which can be heated, for example, via an electric heating element to charge the system. Using, for example, existing turbine and generator, the stored energy (e.g., heat) can be transferred from the high-temperature storage tank into water to produce steam and drive the turbine, thereby producing electricity.

The present subject matter can be implemented at one or more (e.g., all) units of an existing power plant. In some embodiments, the present subject matter includes determining how closely the storage system will match the output capacity of the unit being repurposed. In order to completely replace the capacity from the existing unit, the quality of the steam (e.g., enthalpy and saturation) produced using heat from the high-temperature storage material should match or come close to that produced by the boiler being replaced. Alternatively, the existing unit can be de-rated to a lower capacity level, allowing for lower-quality steam. For example, stages could be removed from a 60 MW turbine to make a 45 MW turbine. The latter option may be appealing in those cases where the full capacity of the plant (which may have been constructed under far different market conditions than are currently experienced) is not needed, or when matching the steam quality would require storage material temperatures and heat exchange rates that are either prohibitively expensive to meet or physically impossible using current technology.

The present subject matter can also include selecting the high-temperature storage material (TES). Existing examples of such materials include the molten salts used in solar thermal power plants. Currently, these materials are designed in tandem with newly constructed turbines, and matched to the thermal energy available from the solar thermal plant (constrained by the amount of heat that can be gathered from the sun). Using an electric heating element to transfer heat into the material removes this constraint, and opens the door to higher-temperature materials. In general, appropriate materials will have high heat transfer rates, high specific heat values, high operating temperature ranges, high limits on operating temperature, and not be overly corrosive. Examples of materials in development which could be used with the present subject matter include (one or more of):
  a. Molten salts.
  b. Molten glasses.
  c. Solid concrete based materials.
  d. Phase change materials (PCMs).
  e. Pressurized water.
  f. Silicon (Si) or silicon based materials.
  g. Metal Hydrides Selection of a material may involve optimization across one or more (e.g., all) of the following dimensions:
  a. Performance, particularly with respect to the desirable qualities listed above.
  b. Cost
    i. Direct: the cost of the material itself.
    ii. Indirect: the cost of materials and subsystems that directly interact with the material. For instance:
      1. A phase-change material with superior energy density could hold the same amount of "charge" in a smaller tank, justifying an increased materials cost.
      2. A material with a higher operating range could require a smaller heat exchanger to produce the same amount of steam, justifying an increased materials cost.

Beyond sizing of the power output itself (either adapting to the existing turbine size or de-rating the turbine), the duration of the charge and discharge cycle should also be sized on a system-specific basis. In particular, different markets may suggest different optimal capabilities: a market with limited-duration daily peaking event would be best served with fast charging (overnight) but could function with a small storage tank; in contrast, a market with infrequent, long-lasting peaks in demand could suggest a small charging system for building up stored energy over a long time period, with large amounts of storage material for sustained discharging. In addition, discharging duration requirements are often specified by the regional transmission organization (RTO) or independent system operator (ISO) in deregulated markets, and can vary from place to place.

In accordance with the present subject matter, energy can be drawn from the electric grid or a dedicated source of electric power such as, e.g., a wind farm or a nuclear power plant to "charge" the thermal storage system by running electricity through the electric heating element. The system is considered fully "charged" when the TES material reaches its maximum design temperature; the maximum design temperature is dependent upon the TES material chosen and the materials used in the tank. The system can be "discharged" by transferring heat from the TES material into water to generate steam; this can be done directly by putting water and the TES material in thermal contact through a heat exchanger. Or it can be done indirectly by first transferring heat to a secondary heat transfer fluid from the TES material, and then using the heat transfer fluid to generate steam.

When the system is neither discharging nor charging, it can be in a "spinning" or "non-spinning" idle state. In the "spinning" state, the system is generating just enough steam to keep the turbine spinning at its minimum mass flow level. That minimum level will depend on the design and age of the steam turbine. Keeping the turbine spinning can be important, for example, for providing certain ancillary services (frequency regulation, spinning reserves) to the grid that require generators to be synchronous with the grid's frequency (60 Hz in the United States). It can also allow the unit to cycle into a discharge mode faster. In the "non-spinning" mode, the system is not generating any steam. Depending on the needs of the operator, the system can be designed with varying levels of insulation on the exterior of the tank to minimize heat losses during idling.

The implementations set forth in the foregoing description do not represent all implementations consistent with the subject matter described herein. Instead, they are merely some samples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein.

The invention claimed is:

1. A method comprising:
    replacing a boiler of an existing power plant with a thermal energy storage assembly to form a thermal energy storage system by removing at least one pipe attached to the boiler and attaching the at least one removed pipe to the thermal energy storage assembly, the thermal energy storage assembly including:
- a thermal storage tank comprising a thermal storage material;
- a charge source operationally connected to the storage tank to heat the thermal storage material; and
- a heat exchanger operationally connected to the storage tank to generate steam using thermal energy stored in the thermal storage material; and connecting the thermal energy storage assembly to one or more turbines so that that the steam generated by the heat exchange can power the one or more turbines to convert thermal energy stored in the thermal storage tank to electricity, the one or more turbines operationally connected to an additional thermal storage tank, the additional thermal storage tank comprising another thermal storage material that can operate at a higher temperature than the thermal storage material of the thermal storage tank.

2. The method according to claim 1, further comprising operationally connecting one or more of a generator, auxiliary system, and transmission system of the existing power plant to the thermal energy storage system,
wherein the replacement of the boiler renders the power plant without any boiler.

3. The method according to claim 1, wherein the thermal energy storage assembly further comprises an additional tank operationally connected to an output of the heat exchanger to receive the thermal storage material discharged from the heat exchanger, the additional tank is also operationally connected to an input of the charge source to supply the charge source with the thermal storage material that has been discharged from the heat exchanger.

4. An energy storage system comprising:
- one or more turbines powered by steam to generate electricity; and
- a thermal energy storage assembly to replace a boiler of an existing power plant, the replacing comprising rerouting at least one pipe from being connected to the boiler to being connected to the thermal energy storage assembly, the thermal energy storage assembly including:
  - an energy storage tank comprising a thermal storage material for storing thermal energy;
  - a charging source operationally connected to the storage tank for heating and charging the thermal storage material; and
  - a heat exchanger operationally connected to the storage tank to generate steam using the thermal energy stored in the thermal storage material, the heating exchanger being operationally connected to the one or more turbines to feed the generated steam to the one or more turbines; and
  - an additional energy storage tank operationally connected to the one or more turbines, the additional energy storage tank comprising another thermal storage material that can operate at a higher temperature than the thermal storage material of the energy storage tank;
- wherein the one or more turbines are powered entirely or substantially entirely by the steam generated by the thermal energy stored in the thermal storage material.

5. The energy storage system according to claim 4, further comprising an additional tank operationally connected to an output of the heat exchanger to receive the thermal storage material discharged from the heat exchanger, the additional tank being also operationally connected to an input of the charge source to supply the charge source with the thermal storage material that has been discharged from the heat exchanger.

6. The energy storage system according to claim 4, wherein the one or more turbines are part of an existing power plant.

7. The energy storage system according to claim 4, further comprising a generator powered by the one or more turbines to generate electricity.

8. The energy storage system according to claim 7, wherein the generator is part of an existing power plant.

9. The energy storage system according to claim 4, wherein the one or more turbines include a high pressure turbine and a lower pressure turbine, the heat exchanger being connected to the one or more turbines such that the high pressure turbine is bypassed.

10. The energy storage system according to claim 4, wherein the charging source is submerged in the energy storage tank.

11. The energy storage system according to claim 4, wherein the charging source is external to the energy storage tank.

12. The energy storage system according to claim 4, wherein the other thermal storage material is configured to super-heat a medium by the heat exchanger.

13. The energy storage system according to claim 4, wherein the system is operable in an idling mode in which minimal or no heat is added by the charging source to the thermal storage material to maintain a charged state.

14. The energy storage system according to claim 4, wherein the system is operable in an on-reserve mode in which a minimal amount of thermal energy is drawn from the energy tank to maintain the one or more turbines in a spinning state without producing a substantial power out.

15. A method for thermal energy storage comprising:
- storing thermal energy in a thermal storage material of an energy storage tank using a heating element powered by electricity, the energy storage tank and the heating element being a part of a thermal energy storage assembly, the thermal storage assembly having replaced a boiler of an existing power plant, the replacing comprising removing a first pipe connecting the boiler with the existing power plant and connecting the thermal storage assembly with the existing power plant via a second pipe that is separate from the first pipe;
- storing additional thermal energy in another thermal storage material of an additional energy storage tank, the other thermal storage material configured to operate at a higher temperature than the thermal storage material of the energy storage tank;
- using at least one of the stored thermal energy and the stored additional storage thermal energy to heat a heat exchanger to generate a steam; and
- spinning one or more turbines using entirely or substantially entirely the steam generated by the heat exchanger from the stored thermal energy.

16. The method according to claim 15, further comprising operating in an idling mode in which minimal or no heat is added to the thermal storage material to maintain a charged state.

17. The method according to claim 15, further comprising operating in an on-reserve mode in which a minimal amount of thermal energy is drawn from the storage tank to maintain the one or more turbines in a spinning state without producing a substantial power output.

18. The method according to claim 15, further comprising storing the thermal storage material discharged from the heat exchanger in an additional tank.

19. The method according to claim 18, further comprising heating the thermal energy material from the additional tank and pumping the heated thermal energy material to the energy storage tank to be stored.

20. The method according to claim 1, wherein the existing power plant is a natural gas power plant or a biomass power plant.

* * * * *